United States Patent [19]
Powell et al.

[11] 3,927,161
[45] Dec. 16, 1975

[54] PROCESS FOR MANUFACTURING FOAM PADDED SKINNED ARM RESTS AND CRASH PADS

[75] Inventors: Richard E. Powell, Milford; Robert W. Starck, Sears, both of Mich.

[73] Assignee: Sheller-Globe Corporation, Toledo, Ohio

[22] Filed: Nov. 12, 1973

[21] Appl. No.: 415,213

[52] U.S. Cl. ............... 264/46.6; 264/225; 264/267; 264/309; 264/310; 264/313; 264/321; 264/DIG. 51
[51] Int. Cl.$^2$.. B29D 27/04; B29D 7/00; B29D 9/00
[58] Field of Search ...... 264/45, 46, 316, 338, 45.1, 264/46.4, 46.6, DIG. 51; 117/21

[56] References Cited
UNITED STATES PATENTS

| | | | |
|---|---|---|---|
| 3,259,673 | 7/1966 | Ericson | 264/45 |
| 3,286,004 | 11/1966 | Hill et al. | 264/45 |
| 3,553,748 | 1/1971 | Ross | 264/45 X |
| 3,616,171 | 10/1971 | Hoshinson | 264/45 X |
| 3,705,222 | 12/1972 | Rogers et al. | 264/45 |

*Primary Examiner*—H. S. Cookeram
*Attorney, Agent, or Firm*—Harness, Dickey & Pierce

[57] ABSTRACT

A fluidized bed process of manufacturing foam padded, skinned products suitable for use on automotive vehicles and the like, comprising the steps of, providing a vinyl plastic resin in fine particle form, placing the vinyl plastic particles in a fluidized bed apparatus, fluidizing the bed of vinyl plastic particles by passing a gas upwardly therethrough, preheating a mold shaped to a desired form of a skin which is to be formed therein, immersing and rotating the mold in the fluidized bed to form the vinyl plastic skin in the mold, removing the mold and subjecting same to a post heating operation to cure the skin, cooling the mold, stripping the skin from the mold, filling the skin in a second molding operation with a urethane foam forming material, and foaming said material to provide foam padding for the product.

3 Claims, No Drawings

PROCESS FOR MANUFACTURING FOAM PADDED SKINNED ARM RESTS AND CRASH PADS

BACKGROUND OF THE INVENTION

This invention broadly relates to a new process of manufacturing padded skinned products.

In the past it has been known to make products of this type using foam-forming processes and skins prepared by (1) injection molding of plastic materials in pellet or dry-blend form, or (2) vacuumed formed skins of preformed plastic sheet stock, or skins formed by slush molding, or (3) roto-casting of a plastisol solution.

The state of the art is indicated by the following U.S. Pat. Nos. (the disclosures of which are incorporated herein by reference): 3,011,218; 2,996,733; 3,123,403; 2,844,489; 2,974,059; 2,974,060; 2,981,631; 2,987,413.

Accordingly, the main object of this invention is to provide a new process of making padded skinned products.

Other objects, features and advantages of the present invention will be apparent after reading the following description and the appended claims.

SUMMARY OF THE INVENTION

It is not fully understood why the invention discovered and disclosed herein works as well as it does, however, suffice it to say that surprisingly good results are obtainable with this invention. Briefly stated the present invention concerns a new process of manufacturing foam padded, skinned, products suitable for use on automotive vehicles and the like, comprising the steps of, providing a vinyl plastic means in fine particle form operative to provide a finished product with good appearance and flexibility, placing the vinyl plastic particles in a fluidized bed apparatus, fluidizing the bed of vinyl plastic particles by passing a gas upwardly therethrough, preheating a mold shaped to a desired form of a skin which is to be formed therein, immersing and rotating the mold in the bed to form the vinyl plastic skin in the mold, removing the mold and subjecting same to a post heating operation to cure the skin, cooling the mold, stripping the skin from the mold, filling the skin with a urethane foam forming material, foaming said material to provide foam padding to the product.

Viewed from another aspect the process herein consists of heating a thin walled mold to a temperature of 500°–600°. At this time, the mold is placed into a mask, which isolates certain portions from coming in contact with the plastic material. The mold and mask are then either submerged in the plastic powder that is being suspended by air and then rotated; or, the powder can be injected into the mold and mask which serves as a lid and immediately the mold is rotated with the powder then being dumped out. Depending on the thickness of the skin formed, the mold may or may not be placed in another oven to allow the skin to completely post-fuse to reach optimum physical properties. Then the mold and skin are cooled and the skin is removed from the mold and filled with a foam forming material as disclosed herein.

DESCRIPTION OF THE PREFERRED EMBODIMENTS

Using a plastic powder formulation, such as a polyvinyl chloride powder as is described hereinbelow, the plastic powder is placed into a fluidized bed apparatus and air is blown through the bed uniformly to suspend the powder within the bed. A mold is suitably preheated and then masked, with the mold having a suitable mold such as that necessary for the preparation of an armrest skin, and the mold is then immersed and rotated in the fluidized bed of plastic powder. The mold is maintained in the fluidized bed for one-quarter up to several minutes or until a skin of suitable properties and thickness is deposited on the mold wall. The mold is then removed from the bed and the skin preferably is cured in a post fusion oven and then the mold is cooled for example by water cooling and the skin is stripped from the mold. The skin is then filled with a cellular foam-forming material such as a urethane formulation and foaming of this material within the skin is carried out to provide foam padding to the finished product.

The following examples illustrate a preferred formulation for the plastic powder material and a compounding procedure therefore suitable for use in the preparation of crash pads in accordance with the preferred process described above.

EXAMPLE 1

| MATERIAL | PARTS BY WEIGHT |
| --- | --- |
| Firestone PVC 9300 | 51 |
| Firestone PVC 9275 | 10 |
| Union Carbide Flexol 10—10 | 15 |
| Monsanto Santicizer S-261 | 18 |
| Union Carbide Flexol EP-8 | 6 |
| Argus Stabilizer 1482-A | 4 |
| Dow DC203 | 1 |
| Color Pigment | 1.75 |
| Firestone PVC 605 (drying resin) | 2.72 (add when compound is below 90 °F) |

EXAMPLE 2

1. Dump PVC 9300, PVC 9275, color master-batch and approximately one-half total "mixed" liquid portion into paint Welex mixer.
2. Heat to 184° – 185° F.
3. Immediately add balance of liquid under agitation (800–1000RPM).
4. Increase agitation and raise batch temperature to 200°–250° F. at which temperature batch must be immediately dropped into cooling vessel.
5. Cool to 90° F or below.
6. Add Exon 605 and mix 1–2 minutes at low mixing speed. At this point, batch should be quite dry and fluid.
7. Drop completed batch into polyethylene lined fiber container or coated steel drum in preparation for use in fluidized bed.

The advantages of the invention should be fairly apparent from the inventive disclosure given above. In particular however the following advantages are to be noted. First, foamed padded products can be produced in accordance with the invention herein having skins with a thickness as thin as 0.010 inches regardless of the overall surface area of the part. Second, the capital equipment expenditure is much lower with the inventive process herein in comparison with the preparation of foamed padded products wherein the skin is prepared by injection molding. Third, the tooling costs are lower than the costs for the preparation of foamed padded products wherein the skins are formed by injection molding. Forth, the undercuts that cannot be molded by injection molding without expensive and exotic tooling can be performed in accordance with the inventive process herein. Fifth, very elaborate molded detail (grain and stitching) can be duplicated in comparison with the vacuum forming technique for forming skinned padded products. Sixth, deep draws which still produce uniform walls can be handled by the inventive process herein, whereas, these cannot be handled by vacuum foaming techniques for skin preparation in products prepared in the past. Seventh, faster cycle times can be obtained by the inventive process herein vs. roto-casting or slush molding for forming skinned products. Eighth, parts formed by the inventive process herein are virtually stress-free in comparison with similar parts formed using injection molding and vacuum forming.

While it will be apparent that the preferred embodiments of the invention disclosed are well calculated to fulfill the objects above stated it will be appreciated that the invention is susceptible to modification, variation and change without departing from the proper scope or fair meaning of the subjoined claims.

What is claimed is:

1. A process of manufacturing foam padded, skinned flexible products suitable for use on automotive vehicles and the like, comprising the steps of, providing a vinyl plastic resin in the form of fine particles operative to provide a finished product with good appearance and flexibility, said vinyl plastic resin particles being formed from a formulation comprised of (a) a polyvinyl chloride resin, at least one liquid plasticizer, a stabilizer, and a coloring material, and (b) a polyvinyl chloride drying resin, and said particles being prepared by the process of introducing a substantial portion of said part (a) into a mix and heating same, adding the balance of said part (a) to said mix under high agitation and heat conditions, then cooling said mix and adding a polyvinyl chloride drying resin under agitation conditions, placing the vinyl plastic particles in a fluidized bed apparatus, fluidizing the bed of vinyl plastic particles by passing a gas upwardly therethrough, preheating and masking a mold shaped to a desired form of a skin which is to be formed therein, immersing and rotating the masked mold in the bed to form the vinyl plastic skin in the mold, removing the mold and subjecting same to a post heating operation to cure the skin, cooling the mold, stripping the skin from the mold, filling the skin in a second molding operation with a urethane foam forming material, foaming said material to provide a product which is a urethane foam formed adherently within said vinyl plastic skin, and wherein, said preheating is to a temperature of about 450° to about 650° F.

2. The process of claim 1 wherein, said preheating is to a temperature of 500°–600° F.

3. The process of claim 1 wherein, said pre-heating is carried out using gas fired forced air heating chambers.

* * * * *